(12) United States Patent
Dittmer et al.

(10) Patent No.: US 11,223,211 B2
(45) Date of Patent: Jan. 11, 2022

(54) METHOD FOR OPERATING A CHARGING DEVICE

(71) Applicant: Robert Bosch GmbH, Stuttgart (DE)

(72) Inventors: Bernd Dittmer, Ludwigsburg (DE); Taleb Janbein, Sindelfingen (DE); Peter Feuerstack, Ludwigsburg (DE); Steffen Eppler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 206 days.

(21) Appl. No.: 16/494,082

(22) PCT Filed: Feb. 21, 2018

(86) PCT No.: PCT/EP2018/054224
§ 371 (c)(1),
(2) Date: Sep. 13, 2019

(87) PCT Pub. No.: WO2018/166767
PCT Pub. Date: Sep. 20, 2018

(65) Prior Publication Data
US 2020/0136407 A1 Apr. 30, 2020

(30) Foreign Application Priority Data
Mar. 14, 2017 (DE) ...................... 10 2017 204 247.8

(51) Int. Cl.
*H02J 7/00* (2006.01)
(52) U.S. Cl.
CPC ...... *H02J 7/00041* (2020.01); *H02J 7/00036* (2020.01)
(58) Field of Classification Search
USPC ................................ 320/106, 132, 133, 155
See application file for complete search history.

(56) References Cited

U.S. PATENT DOCUMENTS

| | | |
|---|---|---|
| 5,493,199 A | 2/1996 | Koenick et al. |
| 2014/0207397 A1 | 7/2014 | Cooley et al. |
| (Continued) | | |

FOREIGN PATENT DOCUMENTS

| | | |
|---|---|---|
| DE | 102009016624 | 9/2010 |
| DE | 102011008674 | 7/2012 |
| (Continued) | | |

OTHER PUBLICATIONS

International Search Report for Application No. PCT/EP2016/068498 dated Oct. 25, 2016 (English Translation, 2 pages).

*Primary Examiner* — Samuel Berhanu
(74) *Attorney, Agent, or Firm* — Michael Best & Friedrich LLP

(57) ABSTRACT

The invention relates to a method for operating a charging device for charging an electric energy storage device from a first charge state to a second charge state. The first charge state is lower than the second charge state, and the charging device is connected to an interface. The charging device communicates with the energy storage device and ascertains the charge state thereof. In an additional step, the charging device obtains the efficiency characteristic field of the electric energy storage device and the efficiency characteristic field of the charging device. The invention relates to a method for operating a charging device for charging an electric energy storage device from a first charge state to a second charge state. The first charge state is lower than the second charge state, and the charging device is connected to an interface. The charging device communicates with the energy storage device and ascertains the charge state thereof. In an additional step, the charging device obtains the efficiency characteristic field of the electric energy storage device and the efficiency characteristic field of the charging device.

9 Claims, 3 Drawing Sheets

(56) References Cited

U.S. PATENT DOCUMENTS

| | | |
|---|---|---|
| 2014/0327306 A1 | 11/2014 | Inoue |
| 2015/0360578 A1* | 12/2015 | Duan .................... B60L 58/12 340/455 |
| 2018/0054068 A1* | 2/2018 | Jang ................... H02J 7/00712 |

FOREIGN PATENT DOCUMENTS

| | | |
|---|---|---|
| DE | 112012005842 | 11/2014 |
| DE | 102015203603 | 9/2016 |
| EP | 2819265 | 12/2014 |
| JP | 0919074 | 1/1997 |
| JP | 2010124652 | 6/2010 |
| JP | 2012110084 | 6/2012 |
| WO | 2006101188 | 9/2006 |
| WO | 2010022059 | 2/2010 |

\* cited by examiner

METHOD FOR OPERATING A CHARGING DEVICE

BACKGROUND OF THE INVENTION

The present invention relates to a method for operating a charging device.

Charging devices are used for charging electrical energy stores in order to convert the alternating current from the power supply system into direct current with a voltage matched for charging. Charging devices are likewise used in order to charge, for example, electrical energy stores from DC power supply systems when the voltage of the DC power supply system needs to be matched for charging electrical energy stores. In the case of charging devices for charging electrical energy stores such as, for example, rechargeable batteries or storage capacitors, conventionally the so-called IU method is used. By virtue of this method, the electrical energy stores are charged with a constant voltage or with a constant current. The maximum current intensity and the maximum voltage are selected depending on the requirements of the electrical energy store, and the available performance capability of the charging device and of the power supply system. If the performance capability of the power supply system is less than the performance capability of the charging device, the power drawn from the power supply system for charging is limited in such a way that no damage occurs on the power supply system or the protective devices do not respond and interrupt the charging operation. Taking into consideration the current and voltage limits of the energy store and the performance capability of the charging device and of the power supply system, the charging process takes place in each case with the highest possible charging capacity of the respective operating point. The charging of a discharged electrical energy store takes place using the maximum available charging current of the charging device until the voltage limit of the electrical energy store is reached. Then, the charging capacity decreases at a constant charging voltage successively until the end-of-charge voltage is reached by a reduction in the charging current. Charging with an excessively high charging current or an excessively high charging voltage would destroy the electrical energy store. The heat losses occurring during charging of the electrical energy store are dissipated away from the electrical charging device and the electrical energy store using various cooling methods such as, for example, air or liquid cooling. The charging operation starts automatically once the charging device is switched on; the beginning of the charging operation can be preset by the user using a time preset option.

For example, DE 11 2012 005 842 discloses a charging device for charging an electrical storage battery. This charging device controls the charging and discharging using the different voltages from different electrical storage batteries on the basis of the IU method. The charging of electrical energy stores disadvantageously takes place in such a way that the respective combination of charging device and electrical energy store results in an energy transfer with the highest possible energy. Thus, in the case of a charging device, the quickest possible charging operation is achieved. The disadvantage with this is that no consideration is given to the families of efficiency characteristics of the components involved in the charging method by the implemented IU charging method and therefore increased heating of the charging device and electrical energy store is disadvantageously accepted. This heat needs to be dissipated as waste heat. This means that, for example in the case of charging devices for electrical energy stores for electrically operated road vehicles and industrial trucks, disadvantageously complex devices for cooling the components need to be provided. The corresponding energy stores likewise disadvantageously need to be thermally monitored and cooled, which is complex. In the standard SAE J 1772, this disadvantage results, for example, in forced ventilation of buildings being required during charging of electrical energy stores of electrically driven vehicles. Failure of the forced ventilation would result in a termination of the charging operation. In addition, the heating during charging disadvantageously results in accelerated ageing of the charging device and of the electrical energy store.

There is therefore the need for a method by which the heating of the components is reduced and the accelerated ageing of the charging device and of the energy store to be charged is avoided.

SUMMARY OF THE INVENTION

The method according to the invention has the advantage that, in order to charge an electrical energy store, charging durations for the quickest charging and for relatively slow charging operations with less heating of the components taking into consideration the families of efficiency characteristics of the charging device and/or the electrical energy store are output on an interface.

In accordance with the invention, for this purpose a method is provided for operating a charging device for charging an electrical energy store from a first state of charge to a second state of charge, wherein the first state of charge is less than the second state of charge, and the charging device is connected to an interface, comprising, in a first step, communication between the charging device and the electrical energy store to be charged in order to determine the first state of charge of the electrical energy store. In a second step, the charging device communicates with the electrical energy store and obtains a first family of efficiency characteristics of the electrical energy store. In a third step, the charging device obtains a second family of efficiency characteristics of the charging device. In a fourth step, the charging device determines a first charging duration without taking into consideration the first and second families of efficiency characteristics. In a fifth step, a second charging duration is determined taking into consideration the first family of efficiency characteristics. In a sixth step, a third charging duration is determined taking into consideration the second family of efficiency characteristics. In a seventh step, a fourth charging duration is determined taking into consideration the first and second families of efficiency characteristics. In an eighth step, the first charging duration and the second charging duration and the third charging duration and the fourth charging duration are output on the interface. The consideration of the families of efficiency characteristics has the advantage that the heating of the components caused by the charging operation is reduced to a minimum. If there is more time available than the shortest charging duration for the charging operation, a number of further advantages result owing to the matching of the IU charging method using operating points with a relatively low charging capacity which is below the maximum charging capacity. By virtue of the heating of the components being reduced to a minimum, the cooling devices can be designed to be simpler, less expensive and smaller or can even be dispensed with entirely. For example, liquid cooling of the components can be replaced by ribs for air cooling of the components. Secondly, the energy losses occurring during charging can already be reduced by virtue of the fact that, for example, the cooling cycle does not need to be operated actively during the charging operation. As a result, there is a reduction in the system costs and inexpensive charging for the user of the charging device since the charging losses which are not arising or are markedly reduced do not need to be paid for beyond the costs involved in drawing the electrical current. In addition, the heating of the components being reduced to a minimum results, owing to the reduced ageing in the case of relatively low thermal loads, in an extension of the life of all of the components involved in the energy transfer taking place during charging, for example the electrical energy store and the charging device. It is furthermore advantageous to output the charging durations on the interface and to give the user the option of selecting between the various charging durations, the costs associated therewith and the heating of the components.

Advantageously, the charging device communicates with a server and requests the present electricity tariff. It is of great advantage that, by taking into consideration the present electricity tariff and the use of the energy-efficient extended charging durations with improved overall efficiency, the costs for the charging operation are minimized. Secondly, advantageously a very low electricity tariff can be used for quick charging of the electrical energy store when the low electricity costs eliminate the disadvantage of the relatively high energy demand owing to the relatively poor efficiency and the energy consumption of the auxiliaries of the cooling circuit.

Advantageously, the user can preset the beginning of the charging operation in such a way that the charging operation is completed before the next planned journey begins. Furthermore, the charging operation can preferably also be set by the user in a time period when a low load on the power supply system is expected or a time period in which there is excess electrical energy available from renewable sources.

It is advantageous that the charging device can automatically select the beginning of the charging operation without any user intervention. This is a simple way of achieving a situation whereby the charging operation is started reliably without any user intervention when there is a connection between the charging device and the power supply system even when there is no user preset.

Advantageously, the charging device selects the time depending on the electricity tariff. The charging device can advantageously automatically select the beginning of the charging operation in such a way that a low-cost electricity tariff is used during the charging operation.

Furthermore, it is advantageous that a user presets, to the charging device, the charging duration within which the energy store is charged from the first state of charge to the second state of charge. It is advantageous for the user that said user can, by virtue of this preset, match the charging of the electrical energy store to his own requirements. By virtue of presetting the charging durations, the user can choose between the quickest possible charging method and the charging method which is the most energy efficient.

It is furthermore advantageous that the charging device automatically selects the first charging duration or the second charging duration or the third charging duration or the fourth charging duration taking into consideration the electricity tariff. This advantageously means that, in the case of a low electricity tariff, the charging device automatically selects a short charging duration when a cost advantage for the charging is achieved despite the relatively poor efficiency. It is likewise advantageous that, in the case of a high electricity tariff, the charging device automatically selects a relatively long charging duration in order to use the electrical energy drawn as efficiently as possible for charging the electrical energy store.

BRIEF DESCRIPTION OF THE DRAWINGS

Further features and advantages of the present invention will become apparent to a person skilled in the art from the description below relating to exemplary embodiments, which should not, however, be considered to be restrictive to the invention, with reference to the attached drawings.

In the drawings.

DETAILED DESCRIPTION

Figure 1:
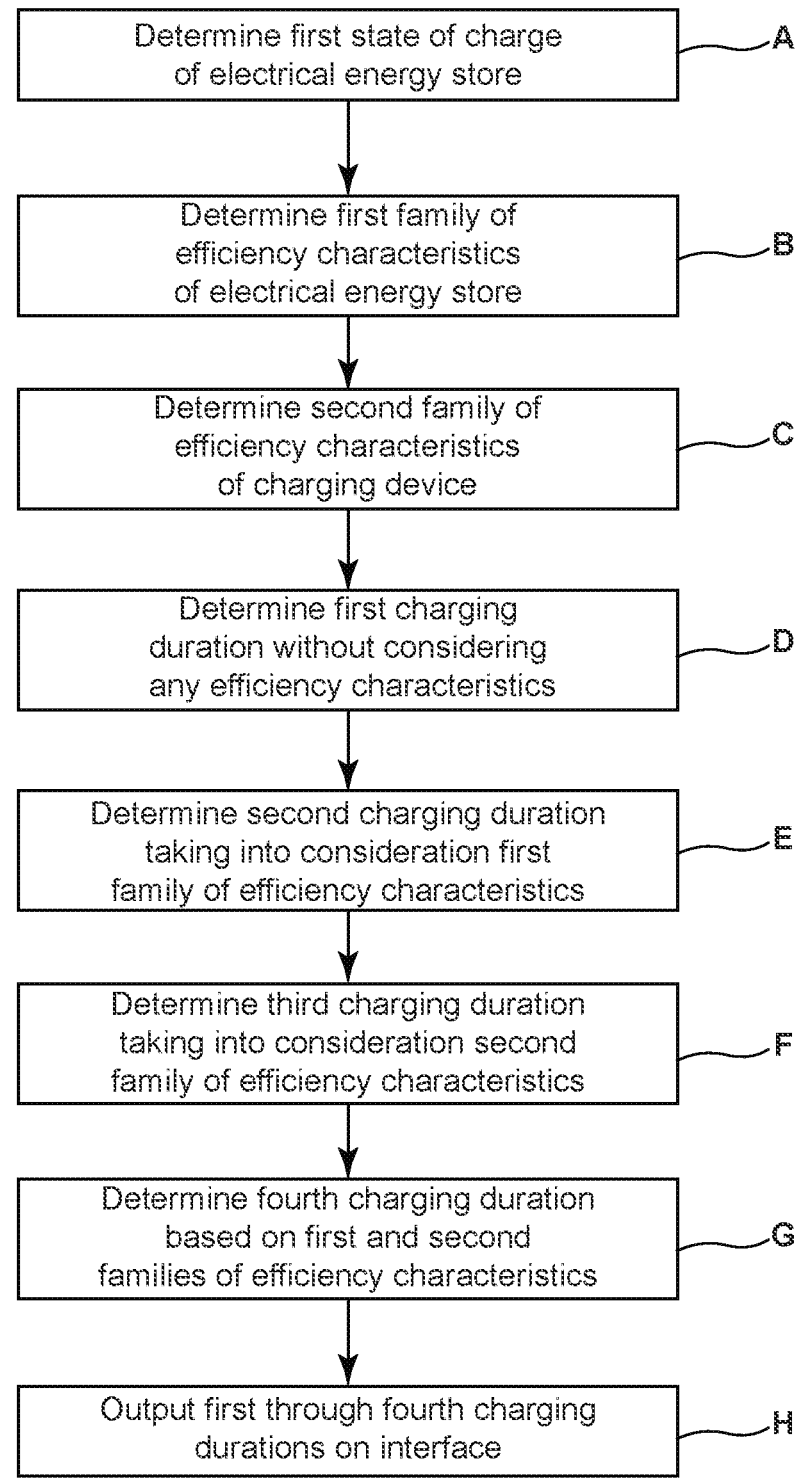
FIG. 1 shows a schematic illustration of a sequence of the method for charging an electrical energy store.

All of the figures are merely schematic illustrations of the method according to the invention or parts thereof in accordance with exemplary embodiments of the invention. In particular, distances and size relationships are not reproduced true to scale in the figures. Corresponding elements have been provided with the same reference numerals in the various figures.

FIG. 1 shows a schematic illustration of the method according to the invention for charging an electrical energy store/electrical energy storage device 20. In a first method step A, the charging device 10 communicates with the electrical energy store 20 and determines the first state of charge 22 thereof. In the subsequent second method step B, the charging device 10 determines the first family of efficiency characteristics 40 of the electrical energy store 20. In a third method step C, the charging device 10 determines a second family of efficiency characteristics 41 of the charging device 10. In a fourth method step D, the charging device 10 determines a first charging duration 50 without taking into consideration the first family of efficiency characteristics 40 and the second family of efficiency characteristics 41. In a fifth method step E, the charging device 10 determines a second charging duration 51 taking into consideration the first family of efficiency characteristics 40. In a sixth method step F, the charging device 10 determines a third charging duration 52 taking into consideration the second family of efficiency characteristics 41. In a seventh method step G, the charging device 10 determines a fourth charging duration 53 taking into consideration the first family of efficiency characteristics 40 and the second family of efficiency characteristics 41. In an eighth method step H, the charging device 10 outputs the first charging duration 50 and the second charging duration 51 and the third charging duration 52 and the fourth charging duration 53 on the interface 12. The first charging duration 50 displayed in this case merely takes into consideration the performance capability of the charging device 10 and of the power supply system 11 as well as the first state of charge 21 and the second state of charge 22 of the electrical energy store 20. The families of efficiency characteristics 40 and 41 of the components involved in the charging operation 13, namely the charging device 10 and the electrical energy store 20, are in this case not taken into consideration. The first charging duration 50 is advantageously an option when the electrical energy store 20 is intended to be charged as quickly as possible from a first state of charge 21 to a second state of charge 22. The second charging duration 51 also displayed takes into consideration, in addition to the performance capability of the charging device 10 and of the power supply system 11 as well as the first state of charge 21 and the second state of charge 22 of the electrical energy store 20, the first family of efficiency characteristics 40 of the electrical energy store 20. The second family of efficiency characteristics 41 of the charging device 10 is in this case not taken into consideration. The second charging duration 51 is advantageously an option when the electrical energy store 20 is intended to be charged from a first state of charge 21 to a second state of charge 22 with the lowest possible power losses of the electrical energy store 20 and the power losses of the charging device 10 arising do not have any impact, for example when the charging device 10 is fitted outside the vehicle. The third charging duration 52 also displayed takes into consideration, in addition to the first state of charge 21 and the second state of charge 22 of the electrical energy store 20, the second family of efficiency characteristics 41 of the charging device 10. The first family of efficiency characteristics 40 of the electrical energy store 20 is in this case not taken into consideration. The third charging duration 52 is advantageously an option when an electrical energy store 20 is intended to be charged as quickly as possible from a first state of charge 21 to a second state of charge 22 and the power losses of the charging device 10 arising are intended to be low, for example when the charging device 10 is fitted within the vehicle. The fourth charging duration 53 also displayed takes into consideration, in addition to the first state of charge 21 and the second state of charge 22 of the electrical energy store 20, the first family of efficiency characteristics 40 thereof and the second family of efficiency characteristics 41 of the charging device 10. The advantage of the fourth charging duration 53 is the greatest possible efficiency of the charging operation 13. The use of the fourth charging duration 53 is associated with the lowest possible power losses of the components involved in the charging operation 13, namely the charging device 10 and the electrical energy store 20. The reduced power losses result in reduced heating of the components and therefore in delayed ageing of the charging device 10 and the energy store 20. Advantageously, a user 14 can use the interface 12 to select a charging duration 50, 51, 52, 53 and the time of the start of charging 55. By virtue of inputting a second state of charge 22, the charging of the electrical energy store 20 can be limited by the user 14. In the case of a second state of charge 22 being preset, the charging device 10 determines the charging durations 50, 51, 52, 53 again.

The cited method steps of the method according to the invention are executed in the sequence mentioned. It is likewise possible to execute method steps A to C in any desired sequence and then to execute method steps D to G in any desired sequence. Method step H follows method steps A to G. Individual intermediate steps can be dispensed with when, for example, one of the families of efficiency characteristics 40 and 41 is not available and when the target of the output of at least two different charging durations on the interface 12 is reached.

Figure 2:
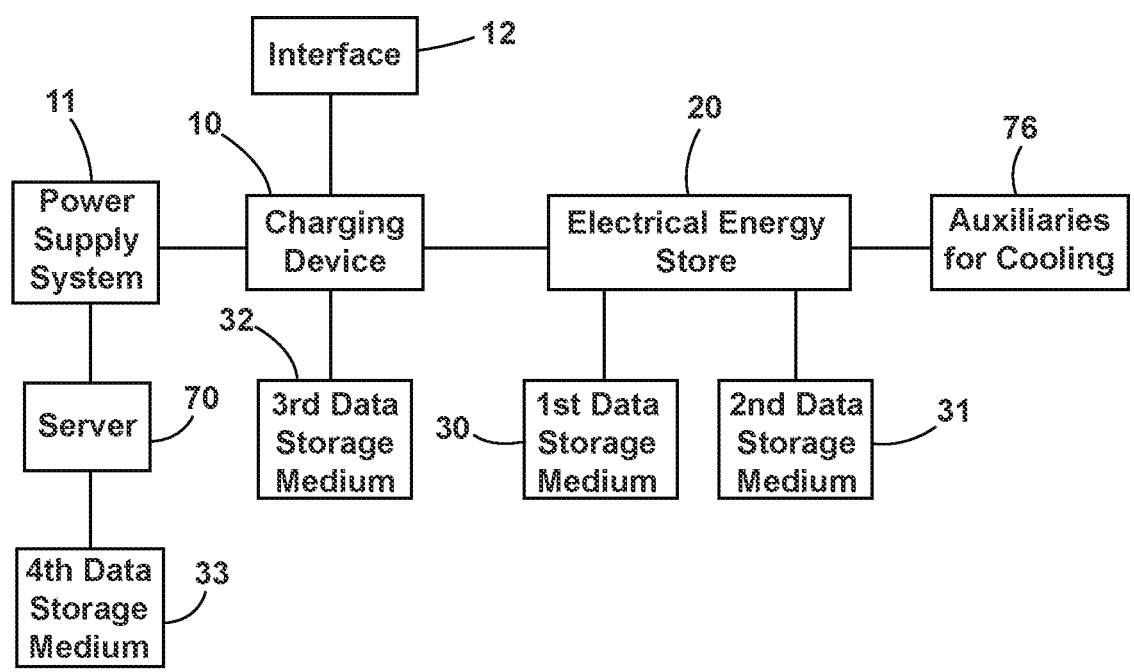
FIG. 2 shows a schematic illustration of the components used for charging an energy store.

FIG. 2 shows a schematic illustration of the components used for charging an electrical energy store 20. Identical elements with respect to the preceding FIG. 1 have been provided with the same reference symbols and will not be explained in any further detail. The charging device 10 converts the electrical energy drawn from a power supply system 11 in such a way that the requirements for charging the electrical energy store 20 are met. For example, the charging device 10 converts the alternating current drawn from a power supply system 11 into direct current with a voltage preset by the electrical energy store 20 for charging. In another embodiment, a charging device 10 operating as DC-to-DC converter converts a direct current drawn from a power supply system 11 into a direct current having a different voltage for charging an electrical energy store 20 at a different voltage level. Both the charging device 10 and the electrical energy store 20 each have efficiencies and heat up during operation owing to the waste heat arising. The auxiliaries 76 required for cooling the components active during the charging operation 13, namely the charging device 10 and the electrical energy store 20, likewise need to be supplied energy by the charging device 10. The energy consumption of the auxiliaries 76 contributes to a reduction in the efficiency of the charging operation 13. In order to determine the charging durations 51, 52 and 53, the charging device 10 communicates with the electrical energy store 20 and requests the first state of charge 21 from the first data storage medium 30 and the first family of efficiency characteristics 40 from the second data storage medium 31 of the electrical energy store 20. The two data storage mediums 30, 31 of the electrical energy store 20 can be integrated in a single data storage medium when the latter stores both the data of the first state of charge 21 and of the first family of efficiency characteristics 40. Furthermore, the second family of efficiency characteristics 41 of the charging device 10 is obtained from the third data storage medium 32. The charging durations 50, 51, 52 and 53 are output by the charging device 10 on the interface 12. Furthermore, the charging device 10 communicates with a server 70 of the power supply system 11 and obtains the electricity tariff 71 from a fourth data storage medium 33. With the aid of the electricity tariff 71, the charging device 10 determines the costs of the electrical energy for the charging durations 50, 51, 52 and 53 and the respective differences and outputs the determined costs and the differences in the costs on the interface 12. Advantageously, a user 14 can use the interface 12 to select one of the charging durations 50, 51, 52 and 53 and the time of the start of charging 55. By virtue of inputting a second state of charge 22, the charging of the electrical energy store 20 by the charging device 10 can be limited by the user 14. In the case of a second state of charge 22 being preset, the charging device 10 determines the charging durations 50, 51, 52, 53 again. The interface 12 can be arranged fixedly on the charging device 10 or in the electrically driven vehicle 1. Alternatively or in addition, a mobile device, for example a smartphone, can likewise be used as the interface 12.

Figure 3:
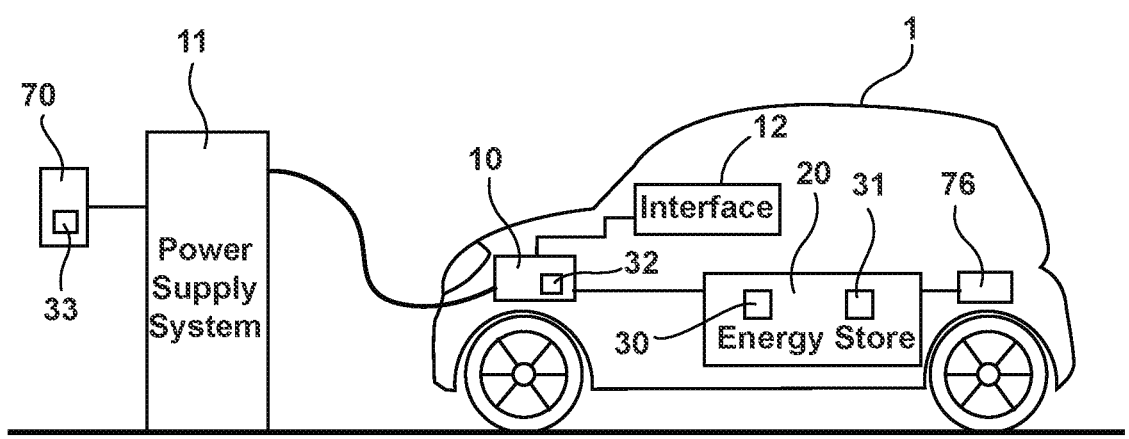
FIG. 3 shows a schematic illustration of the components in an electrically driven vehicle and a vehicle-specific charging device on an AC charging station.

FIG. 3 shows a schematic illustration of the components in an electrically driven vehicle 1. Identical elements with respect to the preceding FIGS. 1 and 2 have been provided with the same reference symbols and will not be explained in any more detail. In order to supply electrical energy to the electrically driven vehicle 1, the vehicle 1 is connected to a power supply system 11. This connection can take place conductively, for example via a cable link, or contactlessly, for example via an inductive connection. The power supply system 11 can provide direct current or alternating current. Suitable connection points to the power supply system 11 are, for example, socket outlets in garages or charging stations (for example conductive charging systems for electric vehicles in accordance with DIN EN61851-1) or transmission antennae of inductive charging devices. The charging device 10 arranged in the vehicle 1 converts the alternating current drawn from a power supply system 11 into direct current having a voltage preset by the electrical energy store 20 for charging. In another embodiment, a charging device 10 operating as DC-to-DC converter converts a direct current drawn from a power supply system 11 into a direct current having a different voltage for charging an electrical energy store 20 at a different voltage level. The charging device 10 can also be embodied as a bidirectionally operating charging device 10 in order to feed energy back to the power supply system 11. The charging device 10 arranged in the vehicle 1 uses a communications link for communication with the server 70 of the power supply system 11 in order to obtain the electricity tariff 71 from a fourth data storage medium 33. This communication can take place using wires by virtue of the charging cable connection or using an additional data cable or by means of a wireless link. The charging durations 50, 51, 52, 53 are output via an interface 12 arranged in the vehicle 1. Advantageously, a user 14 can use the interface 12 to select one of the charging durations 50, 51, 52, 53 and the time of the start of charging 55. By inputting a second state of charge 22, the charging of the electrical energy store 20 by the charging device 10 can be limited by the user 14. When a second state of charge 22 is preset, the charging device 10 determines the charging durations 50, 51, 52, 53 again. The cooling of the components involved in the charging operation 13, namely the charging device 10 and the electrical energy store 20, takes place in the vehicle 1 and is assisted by the auxiliaries 76. The auxiliaries 76 can comprise, for example, fans and/or coolant pumps.

Figure 4:
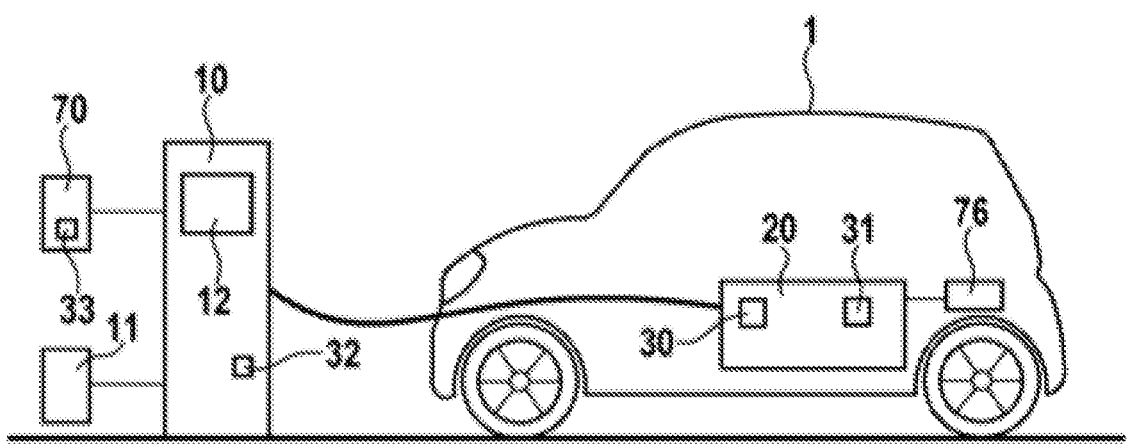
FIG. 4 shows a schematic illustration of the components in an electrically driven vehicle without a vehicle-specific charging device on a DC charging station.

FIG. 4 shows a schematic illustration of the components in a vehicle 1 having an electric drive which is charged using a charging device 10 located outside the vehicle 1. Identical elements with respect to the preceding FIGS. 1, 2 and 3 have been provided with the same reference symbols and will not be explained in any further detail. The connection for charging the electrical energy store 20 of the electrically driven vehicle 1 between the charging device 10 and the vehicle 1 is produced via a conductive connection, for example a cable. Direct current is transmitted via this connection between the vehicle 1 and the charging device 10. The charging device 10 arranged outside the vehicle 1 uses a communications link for communication with the electrical energy store 20 arranged in the vehicle 1 in order to obtain the first state of charge 21 and the second state of charge 22 and the first family of efficiency characteristics 40 of the electrical energy store 20. This communication can take place using wires by virtue of the charging cable connection or using an additional data cable or using a wireless link. The charging durations 50, 51, 52, 53 are output via an interface 12 arranged on the charging device 10. Advantageously, a user 14 can use the interface 12 to select one of the charging durations 50, 51, 52, 53 and the time of the start of charging 55. By inputting a second state of charge 22, the charging of the electrical energy store 20 can be limited by the user 14. When a second state of charge 22 is preset, the charging device 10 determines the charging durations 50, 51, 52 and 53 again. The interface 12 for outputting the charging durations 50, 51, 52, 53 can also be arranged in the vehicle 1 and can be connected to the charging device 10 arranged outside the vehicle 1 via a wired or wireless data link. In the case of a charging device 10 arranged outside the vehicle 1, only the electrical energy store 20 arranged in the vehicle 1 needs to be cooled by vehicle-specific auxiliaries 76. Thus, the energy consumption for the auxiliaries 76 is decreased by the complexity involved in the cooling of the charging device 10 arranged outside the vehicle 1.

The invention claimed is:

1. A method for operating a charging device (10) for charging an electrical energy storage device (20) from a first state of charge (21) to a second state of charge (22), wherein the first state of charge (21) is less than the second state of charge (22), wherein the charging device (10) is connected to an interface (12) and wherein the charging device (10) begins the charging operation (13) at a time which is selected automatically by the charging device (10), and wherein in a first step (A), the charging device (10) communicates with the electrical energy storage device (20) and determines the first state of charge (21) of the electrical energy storage device (20);

in a second step (B), the charging device (10) communicates with the electrical energy storage device (20) and obtains first efficiency characteristics (40) of the electrical energy storage device (20);

in a third step (C), the charging device (10) obtains second efficiency characteristics (41) of the charging device (10);

in a fourth method step (D), the charging device (10) determines a first charging duration without taking into consideration the first efficiency characteristics (40) and the second efficiency characteristics (41);

in a fifth method step (E), the charging device (10) determines a second charging duration taking into consideration the first efficiency characteristics (40);

in a sixth method step (F), the charging device (10) determines a third charging duration taking into consideration the second efficiency characteristics (41);

in a seventh method step (G), the charging device (10) determines a fourth charging duration taking into consideration the first efficiency characteristics (40) and the second efficiency characteristics (41); and in an eighth method step (H), the charging device (10) outputs at least one from a group consisting of: the first charging duration, the second charging duration, the third charging duration, and the fourth charging duration on the interface (12), wherein the charging device (10) automatically selects the first charging duration or the second charging duration or the third charging duration or the fourth charging duration taking into consideration an electricity tariff (71).

2. The method as claimed in claim 1, wherein the charging device (10) communicates with a server (70).

3. The method as claimed in claim 1, wherein the fourth charging duration is associated with lowest possible power losses of components of the charging device (10) and components of the electrical energy storage device (20).

4. The method as claimed in claim 3, wherein the lowest possible power losses of the components of the charging device (10) and the components of the electrical energy storage device (20) results in reduced heating of the components.

5. The method as claimed in claim 3, wherein the second charging duration is associated with lowest possible power losses of the components of the electrical energy storage device (20).

6. The method as claimed in claim 3, wherein the third charging duration is associated with lowest possible power losses of the components of the charging device (10).

7. The method as claimed in claim 3, wherein the interface (12) includes a mobile device.

8. The method as claimed in claim 1, wherein the interface (12) includes a mobile device.

9. The method as claimed in claim 1, wherein a cooling device is dispensed with.

* * * * *